United States Patent
Nory et al.

(10) Patent No.: US 9,345,021 B2
(45) Date of Patent: May 17, 2016

(54) CONTROL AND DATA SIGNALING IN HETEROGENEOUS WIRELESS COMMUNICATION NETWORKS

(71) Applicant: Motorola Mobility LLC, Libertyville, IL (US)

(72) Inventors: Ravikiran Nory, Palatine, IL (US); Ravi Kuchibhotla, Gurnee, IL (US); Jialing Liu, Palatine, IL (US); Robert T. Love, Barrington, IL (US); Ajit Nimbalker, Arlington Heights, IL (US); Kenneth A. Stewart, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 161 days.

(21) Appl. No.: 13/682,721

(22) Filed: Nov. 20, 2012

(65) Prior Publication Data
US 2013/0188505 A1 Jul. 25, 2013

Related U.S. Application Data

(62) Division of application No. 12/767,161, filed on Apr. 26, 2010, now Pat. No. 8,340,676.

(51) Int. Cl.
*H04W 72/00* (2009.01)
*H04W 72/04* (2009.01)
(Continued)

(52) U.S. Cl.
CPC ......... *H04W 72/0426* (2013.01); *H04L 5/0053* (2013.01); *H04W 72/042* (2013.01); *H04W 48/16* (2013.01); *H04W 72/0453* (2013.01)

(58) Field of Classification Search
CPC ..... H04L 5/0053; H04L 5/001; H04L 5/0035; H04L 1/1854; H04L 1/0038; H04J 11/0053; H04J 2211/001

USPC ...................... 455/450, 451, 452.1
See application file for complete search history.

(56) References Cited

U.S. PATENT DOCUMENTS 8,472,389 B2   6/2013  Imamura et al.
2008/0096573 A1  4/2008  Chu
(Continued)

FOREIGN PATENT DOCUMENTS

EP         1991017 A1    11/2008
KR    1020090033126 A     4/2009
(Continued)

OTHER PUBLICATIONS

3GPP TSG RAN1 #57bis; Los Angeles, USA; Jun. 29-Jul. 3, 2009; Motorola, Heterogeneous Support for Reliable Downlink Control; R1-092648.

(Continued)

*Primary Examiner* — Tu X Nguyen
(74) *Attorney, Agent, or Firm* — Faegre Baker Daniels LLP (57) ABSTRACT

A method in a wireless communication device including receiving control signaling from a base station in a control region of a downlink carrier spanning a first bandwidth, receiving a signaling message from the base station indicating a second bandwidth, receiving a first control message within the control region using a first Downlink Control Information (DCI) format size, the first DCI format size based on the first bandwidth, and receiving a second control message within the control region using a second DCI format size, the second DCI format size based on the second bandwidth, wherein the second bandwidth is distinct from the first bandwidth and the first and second control messages indicate downlink resource assignments for the downlink carrier.

22 Claims, 6 Drawing Sheets (51) Int. Cl.
*H04L 5/00* (2006.01)
*H04W 48/16* (2009.01)

(56) References Cited

U.S. PATENT DOCUMENTS

| | | | |
|---|---|---|---|
| 2008/0247375 | A1 | 10/2008 | Muharemovic et al. |
| 2009/0238091 | A1* | 9/2009 | Kim et al. .................... 370/252 |
| 2010/0034152 | A1 | 2/2010 | Imamura |
| 2010/0074235 | A1* | 3/2010 | Sebire et al. ................. 370/338 |
| 2010/0260116 | A1* | 10/2010 | Imamura ............ H04W 72/082 370/329 |
| 2011/0007673 | A1* | 1/2011 | Ahn et al. .................... 370/280 |

FOREIGN PATENT DOCUMENTS

| | | |
|---|---|---|
| RU | 2358385 C2 | 6/2009 |
| WO | 2009041779 A1 | 4/2009 |
| WO | 2009041785 A2 | 4/2009 |

OTHER PUBLICATIONS

3GPP TSG RAN WG1 #57; May 4-8, 2009; San Francisco, USA; Qualcomm Europe; Notion of Anchor Carrier in LTE-A; R1-092061.
3GPP TSG-RAN WG1 Meeting #57; San Francisco, USA; May 4-8, 2009; Panasonic; PDCCH Design for Carrier Aggregation; R1-092230 (R1-091743).
3GPP TSG RAN1 #57bis; Los Angeles, USA; Jun 29-Jul. 3, 2009; Motorola; Heterogeneous Support for Reliable Downlink Control; R1-092640.
3GPP TSG RAN WG1 #57; May 4-8, 2009; San Francisco, USA; Qualcomm Europe; Carrier Aggregation in Heterogeneous Networks; R1-092239.
NEC Group: "Downlink Control Structure for Carrier Aggregation Approach in LTE-Advanced System", 3GPP Draft; R1-083491-DL CTRL LTE-AD, 3rd Generation Partnership Project (3GPP) Mobile Competence Centre; 650, Route Des Lucioles; F-06921 Sophia-Antipolis Cedex; France, no. Prague, Czech Republic; 20080924, Sep. 24, 2008, {retrieved on Sep. 24, 2008].
3GPP TSG RAN1 #54bis, Prague, Czech Republic "PUCCH Frequency Location" Motorola, Sep. 29-Oct. 2, 2008, R1-083886, 4 pages.
3GPP TSG RAN WG4 (Radio) Meeting #48bis, Edingurgh, Scotland "PUCCH options to address UL/DL co-existence" Motorola, Sep. 29 to Oct. 3, 2008, R4-0802561, 6 pages.
Japanese Patent Office, "Office Action" for Japanese Patent Application No. 2013-248081 (GP-101418-00-JP-DIV), dated Aug. 19, 2014, 2 pages.
3GPP TSG RAN WG1 #55bis, R1-090027, Relay Control Signalling Resource Coordination Ljubljana, Slovenia, Jan. 12-16, 2009, 3 pages.
3GPP TSG RAN WG1 #56 bis, R1-091384, "Discussion paper on the control channel and data channel optimization for relay link" Seoul, Korea, Mar. 23-27, 2009, 9 pages.
Federal Service on Industrial Property, Patents and Trade Marks (Rospatent) "Decision on Grant of a Patent for Invention" Russian Patent Application No. 2012102387, dated Sep. 3, 2014, 5 pages.
Korean Intellectual Property Office, "Notice of Preliminary Rejection" for Korean Patent Application No. 10-2011-7030752 dated Feb. 13, 2014, 3 pages.
State Intellectual Property Office of the People's Republic of China, Decision on Rejection for Chinese Patent Application No. 201080027919.X (related to above-captioned patent application), mailed Sep. 16, 2014.
Korean Intellectual Property Office, Notice of Preliminary Rejection for Korean Patent Application No. 10-2013-7025641 (related to above-captioned patent application), mailed Jan. 2, 2014.
Korean Intellectual Property Office, Notice of Preliminary Rejection for Korean Patent Application No. 10-2011-7030752 (related to above-captioned patent application), mailed May 28, 2013.
State Intellectual Property Office of the People's Republic of China, Notification of the First Office Action for Chinese Patent Application No. 201080027919.X (related to above-captioned patent application), mailed Nov. 18, 2013.
State Intellectual Property Office of the People's Republic of China, Notification of the Second Office Action for Chinese Patent Application No. 201080027919.X (related to above-captioned patent application), mailed May 19, 2014.
European Patent Office, Office Action for European Patent Application No. 10729973.7 (related to above-captioned patent application), mailed Oct. 8, 2014.
European Patent Office, International Search Report and Written Opinion for PCT Application No. PCT/US2010/037679 (related to above-captioned patent application), mailed Dec. 25, 2011.

\* cited by examiner

CONTROL AND DATA SIGNALING IN HETEROGENEOUS WIRELESS COMMUNICATION NETWORKS

CROSS REFERENCE TO RELATED APPLICATIONS

The present application is a division of copending U.S. application Ser. No. 12/767,161 filed on 26 Apr. 2010, the contents of which are incorporated herein by reference and from which benefits are claimed under 35 U.S.C. 120, which claims benefits under 35 U.S.C. 119 to U.S. Provisional Application No. 61/220,556 filed on 25 Jun. 2009, the contents of which are also hereby incorporated by reference.

FIELD OF DISCLOSURE

The present disclosure relates generally to wireless communications systems and, more specifically, to the management of interference among the uncoordinated deployment of closed subscriber group (CSG) cells or home eNode Bs within a wireless network of base stations or macro eNode Bs.

BACKGROUND

Some wireless communication networks are proprietary while others are deployed in conformity with one or more standards and accommodate equipment manufactured by various vendors. One such standards-based network is the Universal Mobile Telecommunications System (UMTS) standardized by the Third Generation Partnership Project (3GPP), which is a collaboration of groups of telecommunications associations that generate globally applicable mobile phone system specifications within the scope of the International Mobile Telecommunications-2000 project of the International Telecommunication Union (ITU). Efforts are currently underway to develop an evolved UMTS standard, which is typically referred to as UMTS Long Term Evolution (LTE) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a digital stream, which may include data, control information, or other information, to form a set of OFDM symbols. The subcarriers may be contiguous or non-contiguous and the downlink data modulation may be performed using quadrature phase shift-keying (QPSK), 16-ary quadrature amplitude modulation (16QAM) or 64QAM. The OFDM symbols are configured into a downlink sub frame for transmission from the base station. Each OFDM symbol has a time duration and is associated with a cyclic prefix (CP). A cyclic prefix is essentially a guard period between successive OFDM symbols in a sub frame. According to the E-UTRA specification, a normal cyclic prefix is about five (5) microseconds and an extended cyclic prefix is about 16.67 microseconds. Data from the serving base station is transmitted on physical downlink shared channel (PDSCH) and control information is signaled on a physical downlink control channel (PDCCH).

In contrast to the downlink, uplink communications from the UE to the eNB utilize single-carrier frequency division multiple access (SC-FDMA) according to the E-UTRA standard. In SC-FDMA, block transmission of QAM data symbols is performed by a first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling grants (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions. The UE transmits data on the physical uplink shared channel (PUSCH). The physical control information is transmitted by the UE on the physical uplink control channel (PUCCH).

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator or the number of data streams sent on the same resources, precoding matrix index (PMI), and coding parameters, such as a modulation and coding scheme (MCS) or a channel quality indicator (CQI). For example, if a UE determines that the link can support a rank greater than one, it may report multiple CQI values (e.g., two CQI values when rank=2). Further, the link quality measurements may be reported on a periodic or aperiodic basis, as instructed by an eNB, in one of the supported feedback modes. The reports may include wideband or sub-band frequency selective information of the parameters. The eNB may use the rank information, the CQI, and other parameters, such as uplink quality information, to serve the UE on the uplink and downlink channels.

In the context of the Release-8 specification of Long Term Evolution (LTE) system developed by third generation partnership project (3GPP) that is based on Orthogonal Frequency Division Multiplexing (OFDM) for downlink transmissions, the eNB-to-UE link consists of typically 1-3 OFDM symbols (length is signaled via the physical control format indicator channel (PCFICH)) at the beginning of each 1-ms sub-frame for control channel, i.e., PDCCH, transmissions. Typically an OFDM symbol comprises of an integer number of time units (or samples), where a time unit denotes a fundamental reference time duration. For example, in LTE, the time unit corresponds to $1/(15000 \times 2048)$ seconds. Thus, the PDCCH transmissions are a first control region with a fixed starting location (contemporaneously) at the first OFDM symbol in a sub-frame. All the remaining symbols in a sub-frame after the PDCCH are typically for data-carrying traffic, i.e., PDSCH, assigned in multiples of Resource Blocks (RBs). Typically, an RB comprises of a set of subcarriers and a set of OFDM symbols. The smallest resource unit for transmissions is denoted a resource element which is given by the smallest time-frequency resource unit (one subcarrier by one OFDM symbol). For example, an RB may contain 12 subcarriers (with a subcarrier separation of 15 kHz) with 14 OFDM symbols with some subcarriers being assigned as pilot symbols, etc. Typically, the 1 ms sub-frame is divided into two slots, each of 0.5 ms. The RB is sometimes defined in terms of one or ore more slots rather than sub-frames. According to the Release-8 specification, the uplink communication between the UE and eNB is based on Single-Carrier Frequency Division Multiple Access (SC-FDMA), which is also referred to as Discrete Fourier Transform (DFT)-spread OFDM. It is also possible to have non-contiguous uplink allocations by send uplink control information and uplink data on non-contiguous subcarriers. A virtual resource block is a resource block whose subcarriers are distributed (i.e., non-contiguous) in frequency, whereas a localized RB is an RB whose subcarriers are contiguous in frequency. Virtual RB may have improved performance due to frequency diversity. Release-8 UEs typically share resources in the frequency domain (i.e., on an RB-level or in multiples of an RB) rather than in time in any individual sub-frame on the downlink.

The PDCCH contains control information about the downlink control information (DCI) formats or scheduling messages, which inform the UE of the modulation and coding scheme, transport block size and location, precoding information, hybrid-ARQ information, UE Identifier, etc. that is required to decode the downlink data transmissions. This control information is protected by channel coding (typically, a cyclic-redundancy check (CRC) code for error detection and convolutional encoding for error correction) and the resulting encoded bits are mapped on the time-frequency resources. For example, in LTE Rel-8, these time-frequency resources occupy the first several OFDM symbols in a sub-frame. A group of four Resource Elements is termed as a Resource Element Group (REG). Nine REGs comprise a Control Channel Element (CCE). The encoded bits are typically mapped onto either 1 CCE, 2 CCEs, 4 CCEs or 8 CCEs. These four are typically referred to as aggregation levels 1, 2, 4 and 8. The UE searches the different hypotheses (i.e., hypotheses on the aggregation level, DCI Format size, etc) by attempting to decode the transmission based on allowable configurations. This processing is referred to as blind decoding. To limit the number of configurations required for blind decoding, the number of hypotheses is limited. For example, the UE does blind decoding using the starting CCE locations as those allowed for the particular UE. This is done by the so-called UE-specific search space, which is a search space defined for the particular UE (typically configured during initial setup of a radio link and also modified using RRC message). Similarly a common search space is also defined that is valid for all UEs and might be used to schedule broadcast downlink information like Paging, or Random access response, or other purposes.

The control messages are typically encoded using convolutional encoders. The control region includes a Physical Hybrid ARQ Indicator channel or the PHICH that is used to transmit hybrid ARQ acknowledgments.

Each communication device searches the control region in each subframe for control channels (PDCCHs) with different downlink control indicator (DCI) formats using blind detection, where the PDCCH CRC is scrambled with either a communication device's C-RNTI (UEID) if it is for scheduling data on the Physical Downlink Shared Channel (PDSCH) or Physical Uplink Shared Channel (PUSCH) or scrambled with SI-RNTI, P-RNTI, or RA-RNTI if it is for scheduling broadcast control (system information, paging, or random access response respectively). Other scrambling types include joint power control, semi-persistent scheduling (SPS), and a temporary C-RNTI for use with scheduling some random access messages.

A particular user equipment must locate the control channel elements corresponding to each PDCCH candidate it is to monitor (blindly decode for each subframe control region). The CRC of each PDCCH will be masked by a unique identifier corresponding to the user equipment that the base unit is trying to schedule. The unique identifier is assigned to the UE by its serving base unit. This identifier is known as a radio network temporary identifier (RNTI) and the one normally assigned to each UE at call admission is the cell RNTI or C-RNTI. A UE may also be assigned a semi-persistent-scheduling C-RNTI (SPS C-RNTI) or a temporary C-RNTI (TC-RNTI). When a UE decodes a PDCCH it must apply its C-RNTI in the form of a mask to the PDCCH CRC for successful PDCCH decoding to occur. When a UE successfully decodes a PDCCH of a particular DCI format type it will use the control information from the decoded PDCCH to determine, for example, the resource allocation, Hybrid ARQ information, and power control information for the corresponding scheduled downlink or uplink data transmission. The legacy DCI format type 0 is used for scheduling uplink data transmissions on the Physical Uplink Shared Channel (PUSCH) and DCI format type 1A is used for scheduling downlink data transmissions on the Physical Downlink Shared Channel (PDSCH). Other DCI format types are also used for scheduling PDSCH transmissions including DCI format 1, 1B, 1D, 2, 2A each corresponding to a different transmission mode (e.g., single antenna transmissions, single user open loop MIMO, multi-user MIMO, single user close loop MIMO, rank-1 precoding). Also there are legacy DCI format 3 and 3A for scheduling the transmission of joint power control information. PDCCH DCI format 0, 1A, 3, and 3A all have the same size payload and hence the same coding rate. So only one blind decoding is required for all of 0, 1A, 3, 3A per PDCCH candidate. The CRC is then masked with C-RNTI to determine if the PDCCH was DCI format type 0 or 1A and a different RNTI if it is 3 or 3A. DCI format type 0 and 1A are distinguished by DCI type bit in the PDCCH payload itself (i.e. part of the control information on one of the control information fields). A UE is always required to search for all of DCI formats 0, 1A at each PDCCH candidate location in the UE specific search spaces. There are four UE specific search spaces for aggregation levels 1, 2, 4 and 8. Only one of the DCI format types 1, 1B, 1D, 2, or 2A is assigned at a time to a UE such that a UE only needs to do one additional blind decoding per PDCCH candidate location in the UE specific search space besides the one blind decoding needed for the 0, 1A DCI types. The PDCCH candidate locations are the same for the DCI format types when they are located in the UE specific search spaces. There are also two 16 CCE common search spaces of aggregation level 4 and 8 respectively that are logically and sometimes physically (when there are 32 or more control channel elements) adjacent to the UE specific search spaces. In the common search spaces a UE monitors DCI types 0, 1A, 3, and 3A as well as DCI format type 1C. DCI format type 1C is used for scheduling broadcast control which includes paging, random access response, and system information block transmissions. DCI 1A may also be used for broadcast control in the common search spaces. DCI 0 and 1A are also used for scheduling PUSCH and PDSCH in common search spaces. A UE is required to perform up to 4 blind decodings in the L=4 common search space and 2 blind decodings in the L=8 common search space for DCI formats 0, 1A, 3, and 3A and the same number again for DCI 1C since DCI 1C is not the same size as DCI 0, 1A, 3 and 3A. A UE is required to perform (6, 6, 2, 2) blind decodings for L=(1, 2, 4, 8) UE specific search spaces respectively where L refers to the aggregation level of the search space. The total maximum number of blind decoding attempts a UE is then require to perform per subframe control region is therefore 44 (=2×(6, 6, 2, 2)+2×(4, 2)). A hashing function is used by the serving base unit and the UE to find the PDCCH candidate locations in each search space. The hashing function is based on the UE C-RNTI (or sometimes the TC-RNTI), aggregation level (L), the total number of CCEs available in the control region (Ncce), the subframe number or index, and the maximum number of PDCCH candidates for the search space.

Home-base stations or femto-cells are referred to as Home-eNBs (HeNBs) in the present disclosure. A HeNB can either belong to a closed subscriber group (CSG) or can be an open-access cell. A CSG is set of one or more cells that allow access to only certain a group of subscribers. HeNB deployments where at least a part of the deployed bandwidth (BW) is shared with macro-cells are considered to be high-risk scenarios from an interference point-of-view. When UEs connected to a macro-cell roam close to a HeNB, the uplink of the HeNB can be severely interfered with particularly when the HeNB is far away (for example >400 m) from the macro-cell, thereby, degrading the quality of service of UEs connected to the HeNB. Currently, the existing Rel-8 UE measurement framework can be made use of identify the situation when this interference might occur and the network can handover the UE to an inter-frequency carrier which is not shared between macro-cells and HeNBs to mitigate this problem. However, there might not be any such carriers available in certain networks to handover the UE to. Further, as the penetration of HeNBs increases, being able to efficiently operate HeNBs on the entire available spectrum might be desirable from a cost perspective.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the present invention.

DETAILED DESCRIPTION

In a heterogeneous network comprising macro cells and HeNBs cells that have overlapping BW deployments, certain interference problems can arise. One such interference problem is one where the uplink (UL) transmission from a UE connected to a macro-eNB (MeNB) that is close to (i.e., within signal range of a HeNB) interferes with the UL of a UE connected to the HeNB. This case has been identified as interference scenario 3 in 3GPP TR 25.967 "Home Node B Radio Frequency (RF) Requirements (FDD) (Release 9)" in Universal Terrestrial Radio Access (UTRA) network.

The severity of the problem can be high when the separation between MeNB and the HeNB is large. This is illustrated by some simple calculations as follows. The pathloss (PL) equation for typical macro-cellular environments (from TR 25.814) used in system evaluations is given by PL (dBm)= 128.1+37.6 $\log_{10}$(R), where R is in kilometers, for 2 GHz carrier frequency. The MUE sets its UL transmit power based on the receiver SINR requirement at the MeNB that is further dependent on the desired PUSCH MCS. From TS 36.213, the UL power control equation can be approximated as $P_{Tx,MUE} = \text{Max}\{P_{CMAX}, I_{MeNB} + SNR_{req,MeNB} + PL_{MeNB-MUE}\}$, where $P_{CMAX}$ is the maximum allowed MUE transmit power per power class, $I_{MeNB}$ is the co-channel interference at the MeNB receiver, $SNR_{req,MeNB}$ is the required SINR for MUE UL transmission to support the desired MCS level and $PL_{MeNB-MUE}$ is the patloss from the MeNB to the MUE.

Table 1 summarizes the dependence on distance of PL and MUE transmit power with $P_{CMAX}$=23 dBm, $I_{MeNB}$=−98 dBm and $SNR_{req,MeNB}$=10 dB.

TABLE 1

PL and MUE transmit power dependence on distance

| MeNB-MUE distance (m) | $PL_{MeNB-ME}$ (dB) | $P_{Tx,MUE}$ (dBm) |
| --- | --- | --- |
| 100 | 90.40 | 2.40 |
| 200 | 101.72 | 13.72 |
| 300 | 108.34 | 20.34 |
| 400 | 113.04 | 23.00 |
| 500 | 116.68 | 23.00 |
| 600 | 119.66 | 23.00 |
| 700 | 122.18 | 23.00 |
| 800 | 124.36 | 23.00 |
| 900 | 126.28 | 23.00 |
| 1000 | 128.00 | 23.00 |

From these calculations, a MUE farther than 400 away from MeNB m starts transmitting at maximum power under the chosen conditions. For a macro-cell with 1 km cell radius, this means that roughly 80% of users are transmitting at maximum power. Therefore, a MUE that roams close to a HeNB serving its users can severely degrade the UL throughput in the HeNB particularly when the MeNB-HeNB separation becomes large (>400 m).

Techniques such as adaptive uplink attenuation considered in the UTRA-framework 3GPP TR 25.967 are likely to be investigated in the LTE context for mitigating this problem. However, this alone might not be sufficient in achieving the best spectral efficiency possible with heterogeneous deployments. Some methods that can be useful in making HeNB deployments more efficient are discussed below.

A coarse geolocation of UEs is possible by thresholding either the pathloss (PL) of the UE from a HeNB or alternately by thresholding the differential pathloss between HeNB and MeNB. In one embodiment, if the PL (HeNB to UE) is below a pre-determined threshold, then the UE is close HeNB. In an alternate embodiment, if the difference (PL(MeNB to UE)−PL(HeNB to UE)) exceeds a certain threshold, then the UE is not only close to the HeNB, but it can pose a significant interference risk to the UL of the HeNB. If a macro-cell UE that is far away from the macro-cell but near a CSG cell transmits with large power, it can cause UL interference to CSG UEs. For determining the pathloss from the HeNB to the UE, the UE can read the system information broadcast (SIB) containing information element pertaining to the downlink transmit power of the HeNB. Alternately, it can make some assumptions on the downlink transmit power (e.g., set it to maximum allowed power per the power class of HeNBs deployed in the network).

Several embodiments are described below for ensuring reliable HeNB downlink control when the Home eNode B is close to a macro-cell eNB (MNB) if they are time aligned. Some embodiments rely on a Rel-9 UEs having additional functionality that is similar to a simplified version of carrier aggregation (sub-20 MHz and contiguous) although this feature would more likely be deployed in LTE Release-9. In this case, separate control channel support is needed so that the PDCH in a carrier can schedule resources in a bandwidth that exceeds the PDCCH transmission bandwidth. In another embodiment, HeNB control regions are time-shifted relative to the macro-cell's control region and the macro-cell attenuates or mutes symbol portions that overlap it. Similarly the macro-cell can attenuate RBs that align with the HeNB's time-shifted SCH and PBCH. Carrier aggregation is not necessarily needed in this latter case.

Figure 1A:
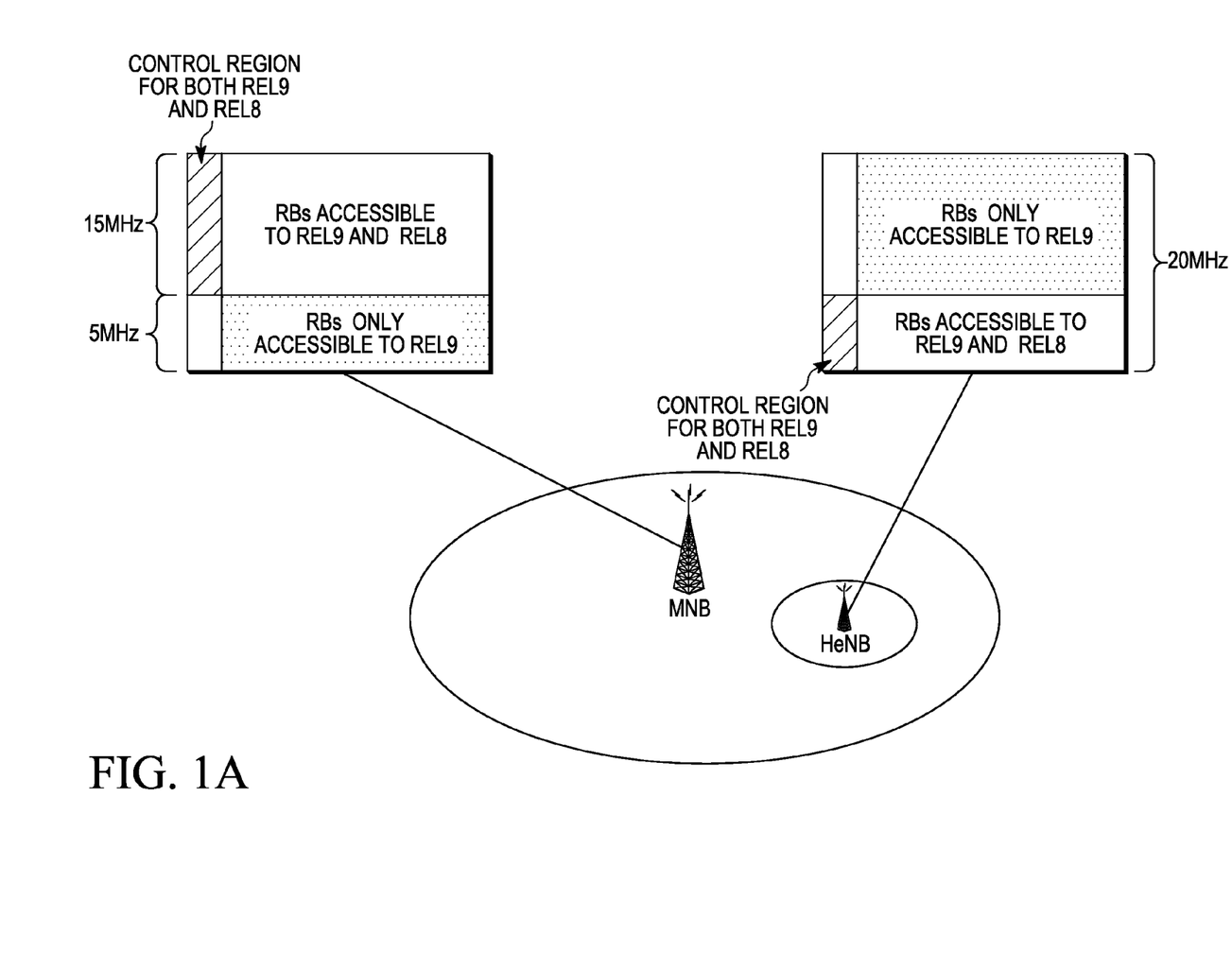
FIG. 1a is a heterogenous deployment with a MNB and HeNB and the downlink subframe configuration of the carrier transmitted by the MNB and HeNB.
Figure 1B:
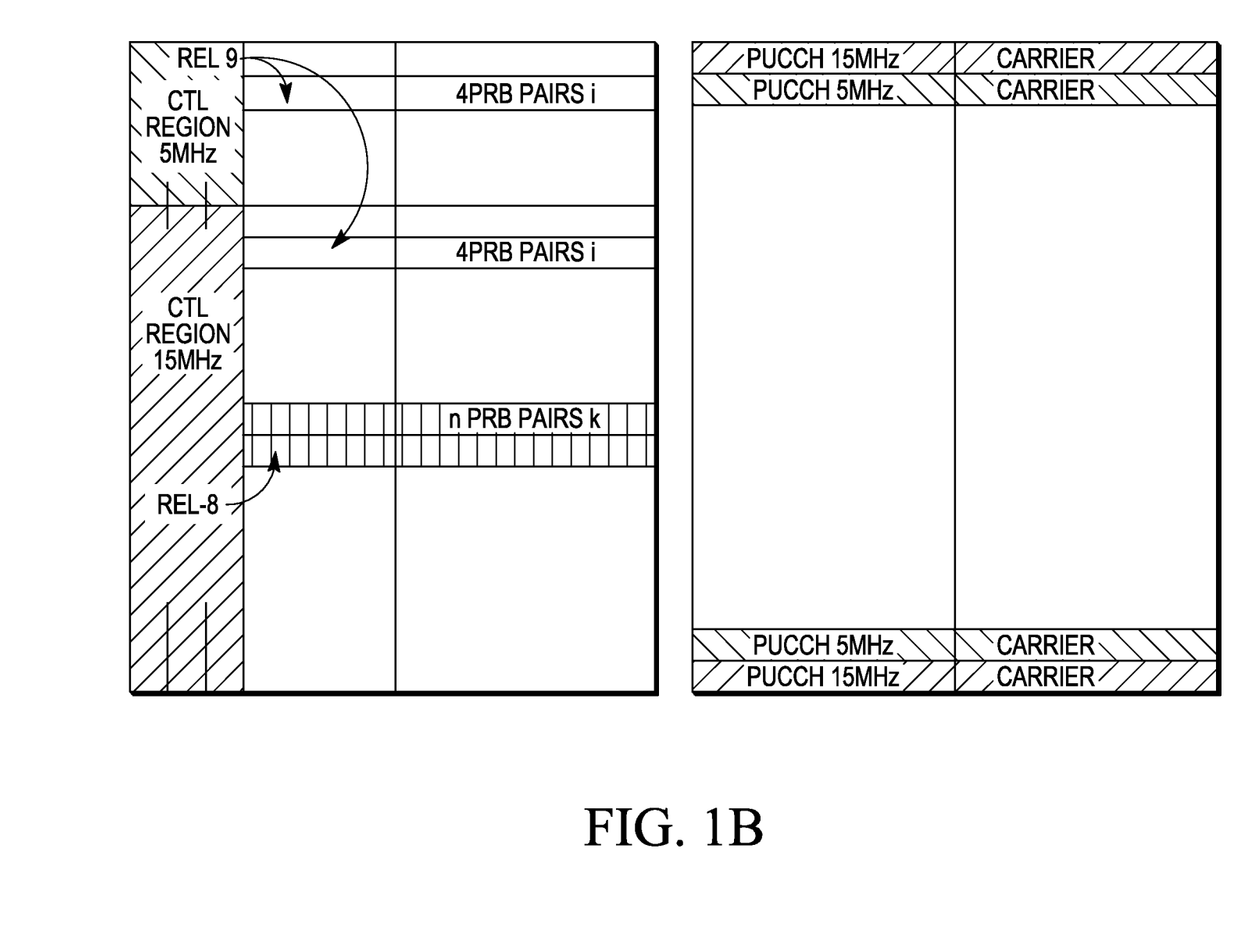
FIG. 1b shows more details about the uplink and downlink subframe structure.

Unlike data (PDSCH, PUSCH), there is no HARQ for control channel transmissions which must typically target fairly low BLER of 1% or less. Low transmission power HeNBs in proximity of high power Macro-cells will not have reliable downlink control channels (e.g., PDCCH, PHICH, PCFICH, PBCH, SSCH). One way to solve this is to segment the LTE carrier and allow the MNB and HeNB to transmit their control signaling in separate frequency domain resources. For example, if the LTE carrier is 20 MHz then it would be segmented into 5 MHz and 15 MHz carriers on the downlink with the MNB transmitting its control signaling (PDCCH, PHICH, PCFICH, P-SCH, S-SCH, PBCH) on the 15 MHz carrier and the HeNB transmitting its control signaling on the 5 MHz carrier (see FIG. 1a and FIG. 1b). Carrier segmentation would avoid any downlink control channel reliability problems.

In one embodiment, both LTE Rel-8 and Rel-9 UEs would access the MNB as a 15 MHz carrier and receive control and broadcast signaling from MNB within 15 MHz. In this embodiment, however, Rel-9 UEs may be additionally be assigned PDSCH resource on the remaining 5 MHz frequency resources using DCI types corresponding to 20 MHz. For HeNB, both Rel-8 and Rel-9 UEs would access the HeNB as a 5 MHz carrier while Rel-9 UEs can additionally be assigned PDSCH resources on the remaining 15 MHz frequency resource using DCI types corresponding to 20 MHz. In this embodiment, Rel-8 UEs would be limited to allocations of 25 RBs (when attached to HeNB) or 75 RBs (when attached to MNB). Rel-9 UEs could be assigned any portion of the 100 RBs (when attached to either the MNB or HeNB).

In this embodiment, Rel-9 UEs would be signaled by higher layers on whether to monitor normal DL DCI types corresponding to the DL carrier bandwidth (25 RBs if attached to a 5 MHz carrier or 75 RBs if attached to a 15 MHz carrier) or to monitor wideband DL DCI types corresponding to 20 MHz with 100 RBs. Although the wideband DL DCI types correspond to 20 MHz resource allocations, they are still signaled on PDCCH spanning the nominal carrier bandwidth (i.e. 5 or 15 MHz) of the carrier that the Rel-9 UE is attached to. Further, reception of wideband DL DCI's can be restricted to the UE specific search spaces. Rel-9 UEs can still continue to receive normal DCI types in the common search space for PDCCHs that signal broadcast messages. The common and UE specific search spaces are defined in 3GPP TS 36.213.

In another embodiment, for the uplink, both Rel-8 and Rel-9 UEs would monitor UL DCI types corresponding to 20 MHz carrier bandwidth at both HeNB and MNB. Uplink control signaling reliability can be maintained by using PUCCH offset (so called "PUCCH over-provisioning") for orthogonal PUCCH assignments between the HeNB and MNB carriers. Since the UL resources are not segmented, UL resource grants can be signaled to both Rel-8 and Rel-9 UEs using 20 MHz DCI types. This requires that Rel-8 devices be tested to ensure they are capable of handling asymmetric DL and UL bandwidths (in this example, DL=5/15 MHz and UL=20 MHz). The DL (dl-Bandwidth) and UL (ul-Bandwidth) system bandwidths are signaled on MIB and SIB-2 respectively (see TS 36.331). Rel-8 device would also have frequency offset between its DL and UL center frequencies. A PBCH and SCH occur in the center of each carrier as defined in Rel-8.

In one embodiment, the DL bandwidth parameter (dl-bandwidth) signaled in the MIB corresponds to the bandwidth on which Rel-8 UEs can be assigned downlink resources. Information regarding the wider bandwidth over which Rel-9 UEs can expect resource assignments can be signaled via the PBCH (Physical-Broadcast Channel) by utilizing the reserved fields in the MIB (Master Information Block). This enables Rel-9 UEs to configure their receiver for wideband reception (i.e., 20 MHz reception) immediately after receiving the PBCH.

In another embodiment, information about the wider bandwidth can be signaled to the Rel-9 UEs using other broadcast messages, e.g., SIBs (System Information Blocks) or by using dedicated RRC (Redio Resource Configuration) messages. In this case, Rel-8 UEs should initially configure their receiver according to the dl-bandwidth parameter signaled in the MIB, i.e., same bandwidth as Rel-8 UEs (e.g., 5 MHz or 15 MHz) and then later reconfigure the receiver to receiver wider bandwidth transmissions (e.g., 20 MHz) after receiving the appropriate broadcast or RRC message from the base station.

In one embodiment, it is assumed the subframe time-alignment between macro-cell and HeNB/Femto/Relay exists. In this embodiment, signaling is supported in Rel-9 to indicate BW of DCI format types to enable resource assignment signaling of up to 20 MHz on a PDCCH that spans a smaller bandwidth (e.g., only 5 MHz or 15 MHz). Alternatively, in another embodiment, a separate PDCCH on one carrier is allowed to indicate resource allocations on a frequency segment attached to the carrier with control signaling (e.g. 5 MHz carrier PDCCH indicates allocations in 15 MHz frequency segment).

Another embodiment uses a PUCCH symmetrical offset (so called "PUCCH over-provisioning") to maintain orthogonal PUCCH assignments when uplink carriers overlap (e.g., both UL carriers are 20 MHz).

Figure 2:
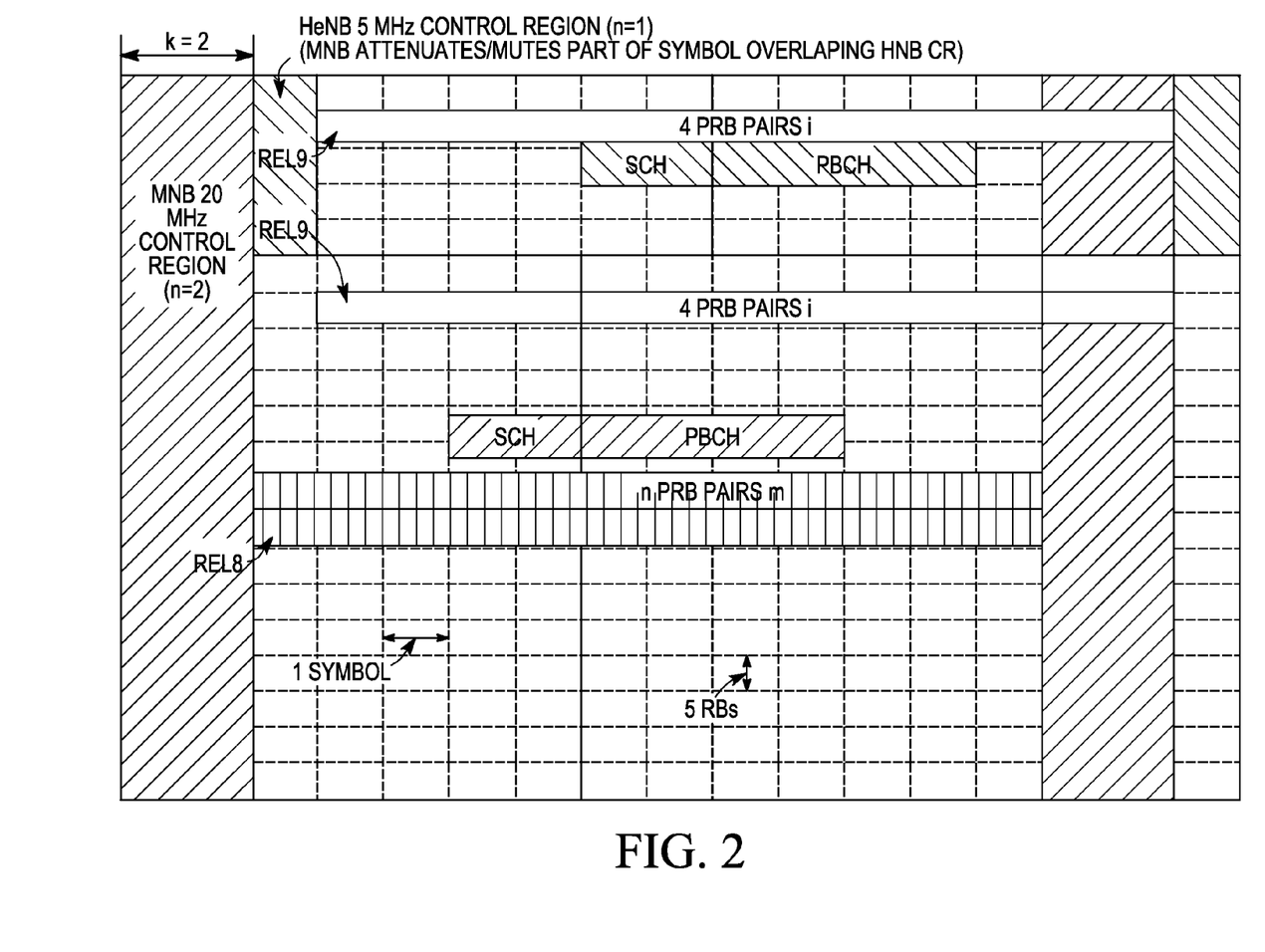
FIG. 2 illustrates the method of shifting HeNB subframes by k=2 symbols relative to macro-cell subframes.

Another embodiment is based on time shifting of HeNB transmission by k symbols (i.e., to avoid overlap with MNB control region size k) and uses MNB power reduction or muting on the portion of a symbol (or symbols) that overlap the control region of HeNB (see FIG. 2). The MNB could also use power reduction on all the RBs (i.e., the 25 RBs) overlapping the HeNB control region to improve PDSCH performance for HeNBs very close to the MNB. A single OFDM symbol HeNB control region (n=1) is preferred for PDSCH efficiency which leaves 5 CCEs for HeNB control channels which should be sufficient for HeNB control signaling. Due to the time shift of HeNB transmissions, the last k symbols of the HeNB PDSCH region would see interference from the macro-cell control region. The HeNB PDSCH overlap with macro-cell control region could be accounted for by either (a) doing nothing and use all non-control symbols for PDSCH, (b) use truncation so only 14−n−k symbols would be used for HeNB PDSCH or (c) still use 14−n symbols but account for overlap via MCS selection. Since the interference from the MNB carrier on the HeNB PDCCH signals (control region) is being avoided by time shifting the MNB carrier need not be segmented. The HeNB carrier can still be segmented.

Figure 3:
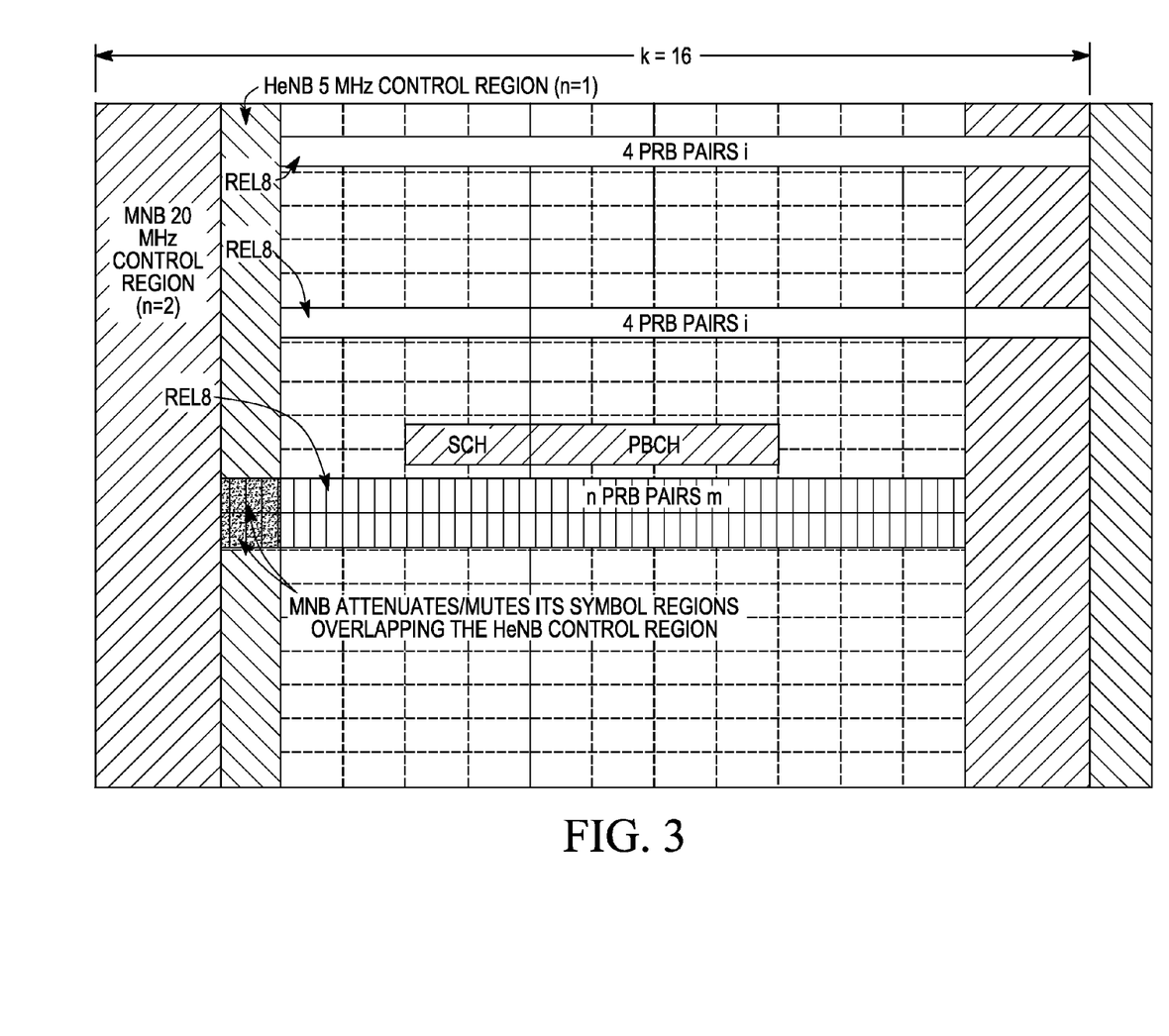
FIG. 3 illustrates the method of shifting HeNB subframe by k=16 symbols relative to macro-cell.

Carrier segmentation for HeNB can be also avoided (as shown in FIG. 3) by allocating HeNB the full 20 MHz band as well but then an additional single subframe shift (k=16 total symbols) is needed so its SCH/PBCH do not overlap the macro-cell's. Then the macro-cell would mute or attenuate its PDSCH symbol(s) overlapping the HeNB control region and would also attenuate/mute RBs that overlap HeNB's PBCH/SCH. RRM measurements of HeNB are conducted as normal.

Table 2 below summarizes the different control reliability techniques being considered in this paper.

In this embodiment, it is assumed that the HeNB is time aligned with macro-cell. Shift HeNB downlink subframe by k symbols relative to macro-cell downlink subframe so no overlap in their control regions. Macro-cell attenuates or mutes symbol(s) in its PDSCH region that overlap the HeNB control region. Macro-cell attenuates or mutes PRBs in PDSCH region that overlap SCH or PBCH.

Additionally, the MNB can attenuate or mute PDSCH RBs that overlap with HeNB's PBCH/SCH. The MNB can also attenuate or mute the transmissions in some portions of its control region. Alternatively, a set of MNB CCEs can be blocked from use to reduce interference on a relatively small number of HeNB CCEs (n=1 HeNB control region size is then possible). The small number of CCEs should be adequate for HeNB scheduling (See Annex A for more details).

In one embodiment, carriers are overlapped and the system relies on PDCCH repetition or increased #CCEs/PDCCH to sustain PDCCH coverage. The embodiment uses 1 subframe shift so PBCH and SCH of HeNB do not overlap with MNB's. MNB can attenuate/mute RBs that overlap HeNB's PBCH/SCH as well as portions of its control region.

In another embodiment, a set of MNB CCEs can be blocked from use that would reduce interference on a relatively small number of HeNB CCEs (n=1 HeNB control region size is then possible). It is assumed a small number of CCEs should be adequate for HeNB scheduling.

If it were possible to choose HeNB PCIDs then a PCID might be chosen so CCE REG locations of the HeNB were as close as possible to those of the MNB. Then separate CCE groups could be defined with one group allocated to the HeNB and the other to the MNB thus reducing interference to HeNB CCEs. Instead a small number of CCEs (e.g., 5 CCEs which is the number of available CCEs in the 5 MHz carrier case for control region size of 1 OFDM symbol (n=1) given 2 or more TX antennas) can be chosen for the HeNB with REG locations that are closely aligned with REG locations of a set of CCEs in the MNB such that the set of CCEs (which can be larger than 5) are not used or seldom used by the MNB (i.e., CCEs are in the MNB's blocked CCE set). In this case, it is not necessary to pick a specific HeNB PCID but the HeNB would need to know the MNB PCID so it could use it and its own PCID to determine the MNB's blocked CCE set which it would then signal to the MNB. The HeNB would also know which CCEs it could allocate (in this case all 5 CCEs would all be in its HNB's CCE Allocation set). In this case, the 5 CCEs of the HNB's CCE allocation set span the HeNB's common and UE specific search spaces. If not (e.g., n>1

TABLE 2

Control Reliability Techniques for Homogeneous Deployments

| Control Reliability Techniques for Homogeneous Deployments | HeNB BW | | MNB BW | | Carrier Agg. | Time Shift (sym) | Grant Rsrc Allocation BW signaled | UL/DL Center Freq aligned | Fixed HeNB CR size | HeNB & MNB Coord. | Orthog. Control Region | Orthog. PBCH & SCH |
|---|---|---|---|---|---|---|---|---|---|---|---|---|
| | DL | UL | DL | UL | | | | | | | | |
| Alt1 - Carrier segmentation | 5 | 20 | 15 | 20 | yes | 0 | yes | no | no | no | yes* | yes** |
| Alt2a - Carrier Overlap w. symbol shifting | 5 | 20 | 20 | 20 | yes | n | yes | no (HeNB) | 1 | yes | yes*** | yes** |
| Alt2b - Carrier Overlap w. symbol shifting | 20 | 20 | 20 | 20 | no | 14 + n | no | yes | 1 | yes | yes*** | yes$^{IV}$ |
| Alt3 - Carrier Overlap w. subframe shifting | 20 | 20 | 20 | 20 | no | 14 | no | yes | 3 | yes | no$^{III}$ | yes$^{IV}$ | n - is size of MNB control region (preferably n < 3)
*if carrier aggregation then symbol muting is required for maintaining HeNB control region orthogonality
**if carrier aggregation then MNB does not allocate RBs overlapping HeNB's PBCH/SCH
***Muting by MNB for symbol portions of PDSCH RBs overlapping HeNB control region
$^{III}$relies on PDCCH repetition assuming fixed control region size of 3 symbols (preferably also for MNB)
$^{IV}$MNB should not schedule RBs overlapping HeNB's PBCH/SCH -- this requires coordination In another embodiment, time shifting to avoid control alignment between the MNB and HeNB is not done. Instead, the HeNB repeats each PDCCH in its control region (or uses extra CCEs) and always uses the largest PCFICH (e.g., n=3) which could be signaled to Rel-9 UEs via SIB. If HeNB has same bandwidth as MNB then full subframe shift (k=14) is needed so that HeNB transmissions of PBCH and SCH do not overlap with MNB transmissions of its PBCH and SCH.

and/or BW>5 MHz) then some CCEs (e.g., 4) in the HeNB common search space and some (e.g., 4) in the HeNB's UE specific search spaces would be selected for its HNB CCE allocation set and based on these the MNB blocked CCE set would be determined. Based on their respective CCE sets the HeNB and MNB would not assign certain UEIDs to their respective served UE's if they would cause hashing to blocked CCEs (or in the case of the HeNB map to CCEs not in the HNB CCE allocation set). The number of blocked UEIDs would be much smaller for the MNB given its control region is 3 OFDM symbols (n=3).

In another embodiment, common reference symbols (CRSs) for the Macro-cell and HeNB can be configured to use different CRS frequency shifts to avoid full alignment which may help with HeNB channel estimation. Note that choosing guard band(s) appropriately through selection of raster frequencies is another way to shift the Common RSs of the different bands to control the degree of overlap (see FIG. 5). If HeNB and Macro-cell are not subframe time aligned then CRS overlap does not need to be addressed. Rel-9 UE served by the HeNB can rate match around the Macro-cell CRS RE locations.

In this embodiment, reference symbols are shifted using an existing PCID method and/or by selection of carrier raster frequencies to improve channel estimation of HeNB/Femto/Relay transmissions. Power boosting of CRS also possible.

Figure 4:
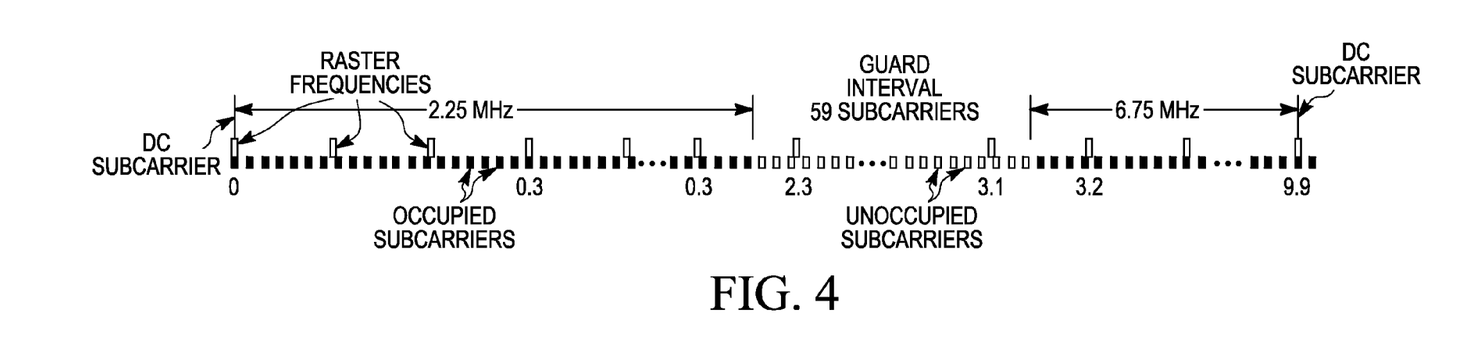
FIG. 4 illustrates an exemplary subcarrier structure of 5 MHz and 15 MHz carriers with raster frequencies separated by multiple of 300 kHz.
Figure 5:
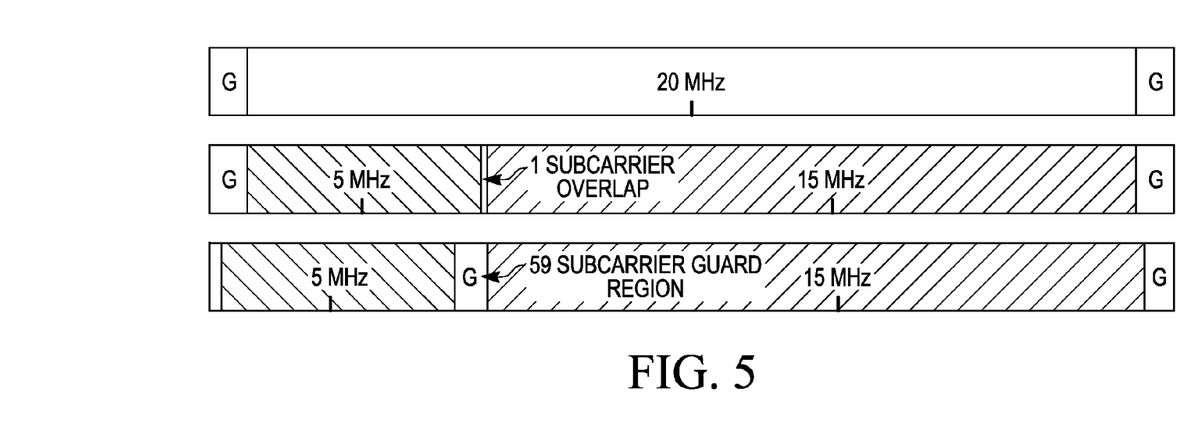
FIG. 5 illustrates an exemplary subcarrier structure of 5 and 15 MHz DL carriers.
Figure 6:
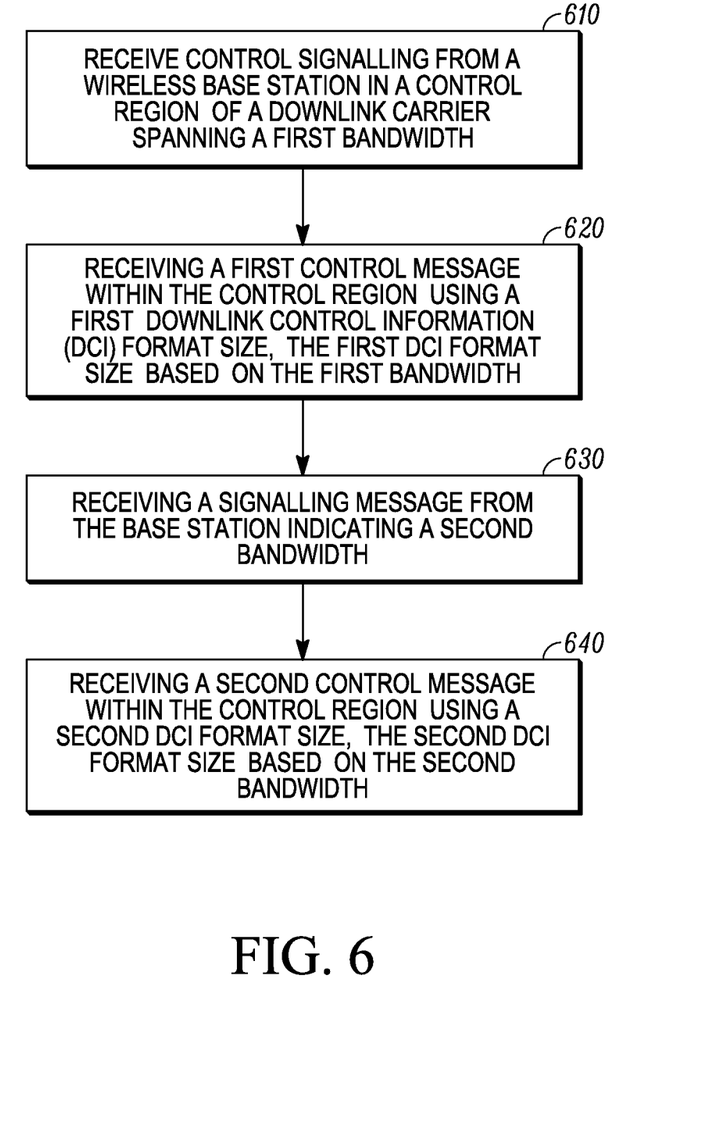
FIG. 6 illustrates a process for receiving control messages whose DCI format sizes are based on the first and second bandwidths.

DC subcarriers of the MNB DL carrier (15 MHz for Rel-8) and the HeNB DL carrier (5 MHz for Rel-8) should be on the 100 kHz raster locations so they are accessible to Rel-8 UEs (e.g., see FIG. 4). Rel-9 UEs would still only require a single FFT to demodulate transmissions for resource allocations spanning 20 MHz by shifting their center frequency to a frequency corresponding to 20 MHz. For example, in FIG. 5 the Rel-9 UE would first camp on 5 MHz or 15 MHz raster then shift its center frequency to the 20 MHz carrier raster frequency. FIG. 5 also shows two possible raster selections for the 5 and 15 MHz carriers. One raster selection results in 1 subcarrier overlap for the 5 and 15 MHz carriers and the other results in a guard interval of 59 subcarriers which would tend to mitigate any adjacent carrier interference (ACI).

In another embodiment, the guard band between 5 and 15 MHz carrier is eliminated (1 subcarrier overlap due to extra DC) so 20 MHz band used by Rel-9 UEs completely includes 5 and 15 MHz carrier RBs. Adjacent carrier interference (ACI) is higher in this case compared to using a guard band (e.g., 59 subcarrier guard band). ACI mitigation is lost if the guard band is cannibalized for more RBs for Rel-9 UE allocations.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a first wireless base station, the method comprising:
   receiving a signal from a second wireless base station;
   determining a first set of control channel elements (CCEs) based on the received signal by at least determining a subset of user equipment IDs (UEIDs) from the total UEIDs that are allowed to be assigned to a user equipment (UE) from the first wireless base station;
   transmitting control signaling on a second set of control channel elements,
   the second set of control channel elements distinct from the first set of control channel elements.

2. The method of claim 1, wherein receiving a signal means receiving a signal containing at least a PCID of the second wireless base station.

3. The method of claim 1, wherein receiving a signal includes receiving a signal containing a set of CCEs that are not used by the second wireless base station.

4. The method of claim 3, wherein receiving a signal includes receiving information via a RRC transmission.

5. The method of claim 1, wherein the receiving a signal includes receiving information via a system or master information block transmission.

6. The method of claim 1, wherein receiving a signal includes receiving a PCID of the second wireless base station to determine a blocked CCE set of the second wireless base station.

7. The method of claim 1, wherein determining a first set of control channel elements based on the received signal includes determining CCEs with REG locations that are closely aligned with REG locations of a set of CCEs in the second base station.

8. The method of claim 1, wherein determining includes defining separate CCE groups, wherein one group is allocated to the first wireless base station and the other is allocated to the second wireless base station.

9. The method of claim 1, wherein the second set of control channel elements is distinct from the first set of control channel elements means that the second set of control channel elements has portions that overlap with the first set of control channel elements in terms of time and frequency allocation.

10. The method of claim 1, wherein the control signaling contains information regarding a modulation coding scheme.

11. The method of claim 1, wherein the control signaling contains information regarding precoding information.

12. The method of claim 1, wherein the control signaling contains hybrid-ARQ information.

13. A wireless base station comprising:
   a transceiver;
   a processor,
   the processor configured to determine a first set of control channel elements (CCEs) based on a signal received by the transceiver from a second base station by at least determining a subset of user equipment IDs (UEIDs) from the total UEIDs that are allowed to be assigned to a user equipment (UE) from the first wireless base station;
   the wireless base station configured to transmit control signaling on a second set of control channel elements,
   the second set of control channel elements distinct from the first set of control channel elements.

14. The base station of claim 13, wherein the signal received from the second base station contains at least a PCID of the second base station.

15. The base station of claim 13, wherein the signal received from the second base station includes a set of CCEs that are not used by the second base station.

16. The base station of claim 13, wherein the signal received from the second base station includes a PCID of the second wireless base station to determine a blocked CCE set of the second wireless base station.

17. The base station of claim 13, the processor configured to determine the first set of control channel elements based on CCEs with REG locations that are closely aligned with REG locations of a set of CCEs in the second base station.

18. The base station of claim 13, the processor configured to define separate CCE groups, wherein one group is allocated to the first wireless base station and the other is allocated to the second wireless base station.

19. The base station of claim 13, wherein the second set of control channel elements is distinct from the first set of control channel elements means that the second set of control channel elements has portions that overlap with the first set of control channel elements in terms of time and frequency allocation.

20. The wireless base station of claim 13, wherein the control signaling contains information regarding a modulation coding scheme.

21. The wireless base station of claim 13, wherein the control signaling contains information regarding precoding information.

22. The wireless base station of claim 13, wherein the control signaling contains hybrid-ARQ information.

* * * * *